Dec. 27, 1927.
G. W. MARTIN
WIRE STRETCHER
Filed May 8, 1926
1,653,866
3 Sheets-Sheet 1
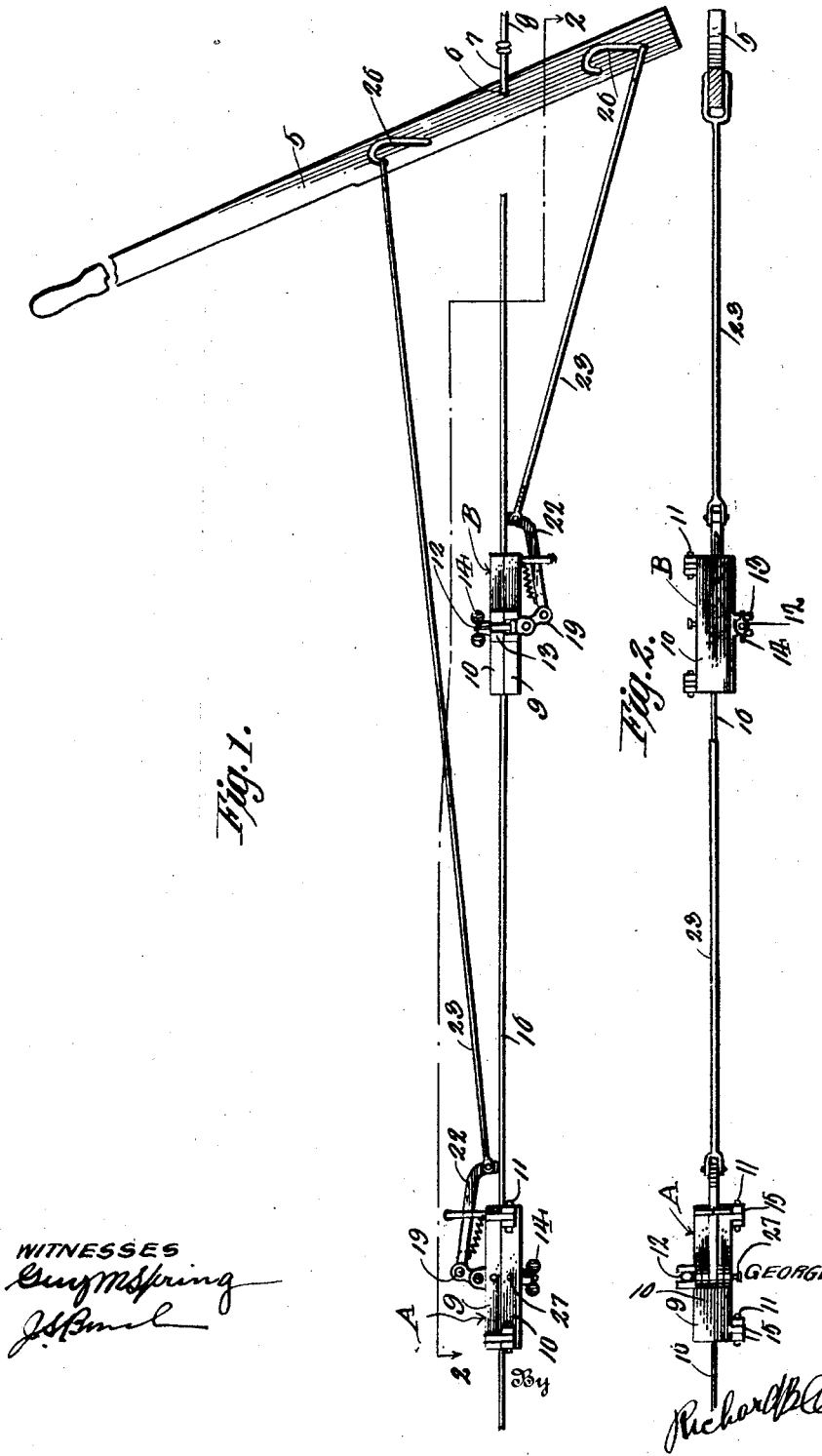

Dec. 27, 1927.  
G. W. MARTIN  
WIRE STRETCHER  
Filed May 8, 1926  
1,653,866  
3 Sheets-Sheet 2
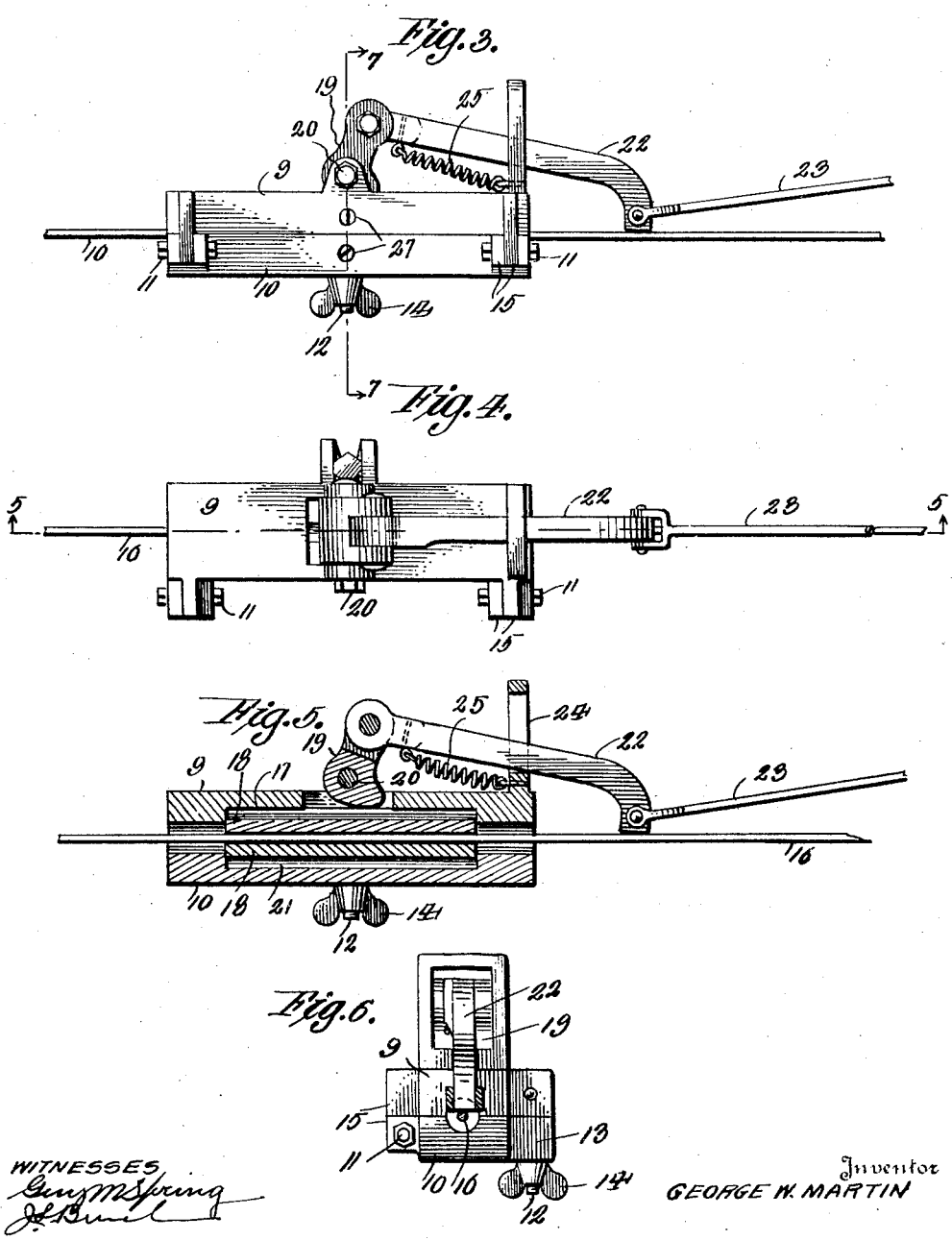

Dec. 27, 1927.
G. W. MARTIN
1,653,866
WIRE STRETCHER
Filed May 8, 1926    3 Sheets-Sheet 3
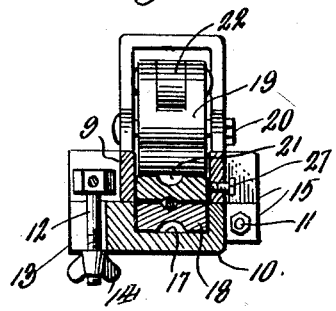
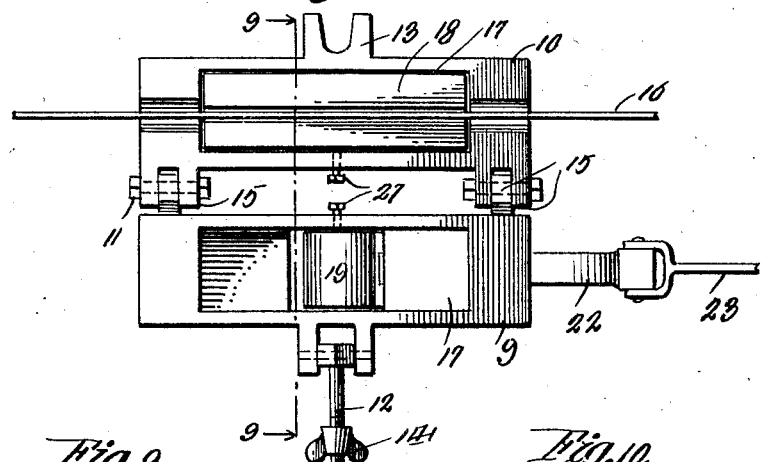
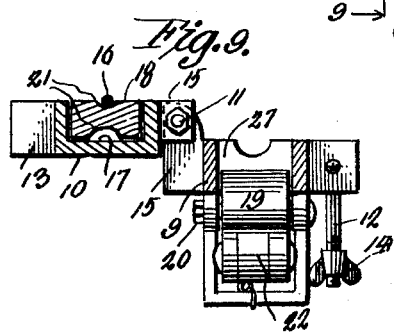
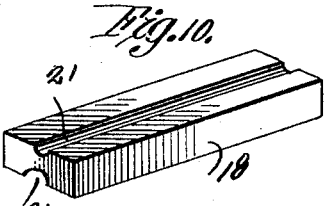
WITNESSES
Inventor
GEORGE W. MARTIN
By Richard B. Owen
Attorney Patented Dec. 27, 1927.

1,653,866

UNITED STATES PATENT OFFICE.

GEORGE W. MARTIN, OF TULSA, OKLAHOMA, ASSIGNOR OF ONE-HALF TO ALLIE M. MARTIN, OF LOS ANGELES, CALIFORNIA.

WIRE STRETCHER.

Application filed May 8, 1926. Serial No. 107,747.

My invention has for its primary object to provide a simple, economical and effective slack take-up mechanism for any type of runner, the same being particularly applicable for stretching runner wires of fences.

Primarily, my invention contemplates the employment of a pair of independent reciprocatory clutch blocks or runner grippers in linked connection with an actuating lever, which actuating lever is adapted to be anchored to a fence post or the like, while the clutch blocks or grippers are adapted to engage the free end portion of the runner wire to be stretched. Thus, by imparting an oscillatory movement to the actuating lever, the clutch blocks will, through their connections, alternately engage the runner wire, whereby said runner wire is intermittently gripped and drawn through the clutch blocks to thus stretch the wire by imparting the desired force in a series of impulses.

A further object of my invention is the provision of simple and effective means for permitting quick and easy adjustment of the stroke of the clutch block-carrying links by shifting the connections of said links with the actuating lever, relative to the pivot or point of oscillation of said lever.

A still further object is to provide an improved construction of clutch block or gripper for wire stretchers of the above kind.

Other objects will appear as the nature of the invention is better understood, and the same consists in the novel form, combination and arrangement of parts hereinafter more fully described, shown in the accompanying drawings and claimed.

In the drawing, wherein like reference characters indicate corresponding parts throughout the several views, Figure 1 is a side elevational view of a wire stretcher constructed in accordance with the present invention and operatively engaged with a runner wire;

Figure 2 is a view partly in top plan and partly in section, as seen when taken upon line 2—2 of Figure 1;

Figure 3 is an enlarged side elevational view of one of the clutch blocks or runner wire grippers associated with and released from the runner wire being stretched;

Figure 4 is a top plan view of the device shown in Figure 3;

Figure 5 is a longitudinal section taken substantially upon line 5—5 of Figure 4;

Figure 6 is an end elevational view looking toward the left of Figure 3;

Figure 7 is a transverse sectional view taken upon line 7—7 of Figure 3;

Figure 8 is a view similar to Figure 4 with the clutch block in open condition and one of the jaws removed;

Figure 9 is a transverse section taken upon line 9—9 of Figure 8; and

Figure 10 is a perspective view of one of the wire gripping jaws of the clutch block shown in Figure 3.

Referring more in detail to the drawings, 5 indicates an actuating lever having a transverse opening 6 intermediate its ends in which is loosely engaged a loop or pivot member 7 carried by one end of an anchor member 8 whose other end is adapted to be fastened to a fencepost or the like so that the pivot or point of oscillation of the lever 5 is suitably fixed.

Associated with the actuating lever is a pair of clutch blocks or grippers A and B arranged in spaced tandem relation. Each clutch block comprises an elongated casing preferably formed in similar longitudinal half sections 9 and 10 preferably hinged together along one side as at 11 and detachably or separably held together along the other side by suitable means such as a bolt 12 pivoted to one section 9 and adapted to be swung into position within an outwardly projecting fork or U-shaped keeper 13 rigid with the other section 10, a wing nut 14 being threaded upon the free end portion of the bolt 12 for engagement with the under face of the keeper 13 whereby the casing sections will be tightly drawn together and retained in such relation upon tightening of the wing nut. For effecting the hinge connection between the casing sections, the latter are preferably provided upon adjacent sides with outwardly projecting integral interfitting knuckles as at 15, and upon loosening the nut 14, the bolt 12 may be swung laterally out of engagement with the associated keepers 13 whereby the sections may be swung apart to the position indicated in Figures 8 and 9. The casing of each clutch block or gripper is provided with an axial or longitudinal bore through which the runner wire 16 to be stretched is adapted to be threaded. Thus, the casing sections of each clutch block are formed with mating recesses which cooperate to form the bore when the casing sections are brought together and these recesses have their intermediate portions enlarged to form jaw receiving sockets 17 of relatively long rectangular form as shown. Removably fitted in each jaw receiving socket is an elongated jaw plate 18, so that a pair of cooperating jaws or jaw plates are provided in the casing of each clutch block. The jaw plate in the socket 17 of the casing section 9 is loosely disposed in said socket so as to be freely movable toward and away from the jaw or jaw plate in the socket of the cooperating casing section 10, and means is provided for forcing the jaw of the section 9 toward the jaw of the section 10 so as to cause said jaws to have gripping engagement with the adjacent portion of the runner wire. This means preferably embodies a cam lever 19 fulcrumed as at 20 to the casing section 9 of each clutch block and having an inner cam shoe portion or end projecting inwardly through an opening in said associated section 9 in position to engage or impinge against the adjacent outer face of the adjacent movable or loose jaw or jaw plate 18.

The jaws or jaw plates 18 are capable of being reversed in their sockets 17 and have longitudinal runner wire receiving grooves 21 of different cross sectional sizes in the opposite faces thereof whereby the clutch block may be adapted for engagement with runner wires of various diameters or cross sectional sizes. Suitable manually operable means is provided for securing the jaw plates 18 against outward displacement from their sockets and temporarily while the casing sections are being swung apart or brought together in removal of the clutch blocks from or engagement of the same with the runner wire.

The outer ends of the clutch block cam levers 19 are connected to the actuating lever 5 respectively at opposite sides of the pivot or fulcrum point of the latter by means of short links 22 and relatively longer links 23, each of which longer links has one end adjustably pivoted to the actuating lever 5, whereby the pivotal connections of said longer links 23 with the lever 5 may be adjusted toward and away from each other at different distances from said pivot of the actuating lever 5 for varying the stroke of the links and consequently changing the leverage. Thus, when the pivotal connections of the links 23 are adjusted toward the pivot of the lever 5, the strokes of the clutch blocks are shortened but a greater leverage is obtained as is desirable when the runner wire has been partially stretched and is under considerable tension. Each short link 22 is pivotally attached at one end to a cam lever and has its other or rear end directed inwardly toward the clutch block casing and pivotally attached to the adjacent end of the associated longer link 23 whereby the pivot joint between each pair of links 22 and 23 naturally tends to break inwardly or toward the runner wire when said links are pushed forwardly whereby a most effective position of the shorter link is had for swinging the associated cam lever 19 in releasing the latter for allowing the clutch block to slide forwardly upon the runner while disengaged therefrom or not gripping the same. Such release of the clutch blocks and forward movement of the same is had when adjusting the clutch blocks for a new grip upon the runner wire, the release and adjustment of one clutch block taking place while the engagement of the other clutch block with the runner wire and stretching of the latter is effected by the other clutch block.

In order to positively prevent outward swinging of the associated links 22 and 23 and thereby prevent outward breaking of the pivotal connection therebetween, the clutch block casings are provided with laterally projecting guide plates 24 through which the shorter links 22 slidably project. The inward swinging of the links 22 is limited by engagement of the same with the guide plates 24 at the inner ends of the slots thereof as shown in Figure 5. Each link 22 is connected with the associated clutch block casing by means of a helical tension spring 25 so that the gripping engagement of the clutch block with the runner wire is assisted. In other words, the springs 25 act to swing the cam levers 19 in a direction for causing the same to impinge upon the associated jaw plate 18 whereby the latter is forced toward the cooperating jaw plate and into engagement with the runner wire, such action of the springs being in the nature of an assistance for the links 22 and 23 when the latter are pulled for positively causing a corresponding actuation of the cam levers 19.

The means for permitting the convenient and quick adjustment of the pivotal connections of links 23 with the actuating lever 5, relative to the pivot of said lever, preferably consists in the provision of substantially spiral or hooked-shaped longitudinally extending slots 26 in the lever 5 at opposite sides of and at equal distances from the pivot of said lever, said pivotal connections or pivot elements of the links 23 being freely movable in the slots 26 so as to be positioned at either end thereof. It is noted that the ends of the slots 22 terminate nearer the forward edge of the lever 5 than the intermediate portions of said slots so that the pivotal connections of the links 23 will remain either in the outer or inner ends of the slots when so positioned or adjusted. However, any suitable means may be provided for positively holding the pivotal connections of the links 23 in either the outer or inner ends of the slots if found desirable, the present invention being directed more particularly to the means for permitting the quick adjustment rather than in any positive means for maintaining the adjustment after secured.

In operation, the anchor member or wire 8 is attached to a fence post or the like adjacent the free end of the runner wire 16 to be stretched, whereupon the casing sections of the clutch blocks are released and swung apart. The casing sections 9 are then disposed upon the runner wire so that the latter engages in the proper groove 21 of the jaw plate 18 thereof. The clutch block casing sections 10 are then swung toward the runner wire and the associated sections 9, and then the clutch block casing sections are securely fastened together. Upon completing the above, the device is ready for operation, and upon oscillation of the actuating lever 5, the clutch blocks will be alternately pulled rearwardly and forced forwardly, gripping engagement of the clutch blocks with the runner wire being effected when said blocks are pulled rearwardly, and release of the clutch blocks from the runner wire being effected when the same are forced forwardly to a position for a new grip upon the runner wire. In this way the wire is stretched by imparting the desired force thereto in a series of impulses. Obviously, the shifting of the pivotal connections of links 23 in the slots 26 for changing the stroke of the clutch blocks and the leverage obtained, may be effected without removal of the clutch blocks from the runner wire or disengagement of the pivotal connections from the slots 26.

The jaw plates 18 are shown positioned in their sockets 17 so that the adjacent faces of said jaw plates are those which have the smaller wire receiving grooves 21 therein. Obviously, when operating upon a runner wire of larger diameter, the jaw plates will be reversed in their sockets so as to present the faces of the jaw plates 18 adjacent which have the larger grooves 21 therein.

The means for releasably temporarily holding the jaw plates 18 in the sockets 17 may consist in set screws 27 threaded through the sides of the casing sections 9 and 10 in position to impinge against the adjacent sides of the jaw plates 18 and to force the opposite sides of said jaw plates into engagement with the opposite sides of the sockets 17 thereof. Obviously, when the casing sections are closed and secured together for operation, the set screws 27 will be released so that the desired movement of the jaw plates 18 impinged by the cam levers 19 may be had toward the associated plates 18.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:—

1. In a wire stretcher, a runner-gripper embodying a casing composed of separable longitudinal half sections having mating recesses in adjacent faces thereof cooperating to form a longitudinal bore opening through the ends of the casing and adapted for reception of a runner wire to be stretched, said recesses having enlarged intermediate portions forming sockets, runner wire engaging jaw plates removably fitted in said sockets, and a cam lever pivotally mounted upon one casing section and arranged to impinge against the associated jaw plate for forcing the latter toward the jaw plate of the other casing section.

2. In a wire stretcher, a runner-gripper embodying a casing composed of separable longitudinal half sections having mating recesses in adjacent faces thereof cooperating to form a longitudinal bore opening through the ends of the casing and adapted for reception of a runner wire to be stretched, said recesses having enlarged intermediate portions forming sockets, runner wire engaging jaw plates removably fitted in said sockets, a cam lever pivotally mounted upon one casing section and arranged to impinge against the associated jaw plate for forcing the latter toward the jaw plate of the other casing section, and means to releasably fix said jaw plates in said sockets.

3. In a wire stretcher, a runner-gripper embodying a casing composed of separable longitudinal half sections having mating recesses in adjacent faces thereof cooperating to form a longitudinal bore opening through the ends of the casing and adapted for reception of a runner wire to be stretched, said recesses having enlarged intermediate portions forming sockets, runner wire engaging jaw plates removably fitted in said sockets, and a cam lever pivotally mounted upon one casing section and arranged to impinge against the associated jaw plate for forcing the latter toward the jaw plate of the other casing section, said casing sections being hingedly connected along one side, and means for releasably securing said casing sections together along the other sides thereof.

4. In a wire stretcher, a runner-gripper embodying a casing composed of separable longitudinal half sections having mating recesses in adjacent faces thereof cooperating to form a longitudinal bore opening through the ends of the casing and adapted for reception of a runner wire to be stretched, said recesses having enlarged intermediate portions forming sockets, runner wire engaging jaw plates removably fitted in said sockets, and a cam lever pivotally mounted upon one casing section and arranged to impinge against the associated jaw plate for forcing the latter toward the jaw plate of the other casing section, said casing sections being hingedly connected along one side, and means for releasably securing said casing sections together along the other sides thereof, said last named means comprising clamping means for drawing the sections together.

5. In a wire stretcher, a runner-gripper embodying a casing composed of separable longitudinal half sections having mating recesses in adjacent faces thereof cooperating to form a longitudinal bore opening through the ends of the casing and adapted for reception of a runner wire to be stretched, said recesses having enlarged intermediate portions forming sockets, runner wire engaging jaw plates removably fitted in said sockets, and a cam lever pivotally mounted upon one casing section and arranged to impinge against the associated jaw plate for forcing the latter toward the jaw plate of the other casing section, said jaw plates being reversibly positionable within said sockets and having longitudinal runner-receiving grooves of different sizes in the opposite faces thereof.

6. A wire stretcher including an oscillatory actuating lever adapted to be anchored to have a substantially fixed fulcrum, a pair of runner-grippers arranged in spaced tandem relation and each having a fixed jaw and a jaw movable toward the fixed jaw, a cam lever pivoted to each runner-gripper in position to impinge against the associated movable jaw for forcing the same toward the associated fixed jaw, a link pivoted to the outer end of each cam lever and having an inwardly directed end, and a further link connecting the inturned end of each first named link with the actuating lever and respectively at opposite sides of the fulcrum of the latter.

7. A wire stretcher including an oscillatory actuating lever adapted to be anchored to have a substantially fixed fulcrum, a pair of runner-grippers arranged in spaced tandem relation and each having a fixed jaw and a jaw movable toward the fixed jaw, a cam lever pivoted to each runner-gripper in position to impinge against the associated movable jaw for forcing the same toward the associated fixed jaw, a link pivoted to the outer end of each cam lever and having an inwardly directed end, and a further link connecting the inturned end of each first named link with the actuating lever and respectively at opposite sides of the fulcrum of the latter, and a guide rigid with each runner-gripper through which the associated first named link slidably projects for preventing outward swinging of said first named link beyond a predetermined point.

8. A wire stretcher including an oscillatory actuating lever adapted to be anchored to have a substantially fixed fulcrum, a pair of runner-grippers arranged in spaced tandem relation and each including a jaw actuating cam lever, pairs of pivotally connected links operatively connecting the respective cam levers with the actuating lever respectively at opposite sides of the fulcrum of said actuating lever, and a tension spring connecting a link of each pair with the associated runner-gripper for assisting the links in actuating the cam levers for causing gripping engagement of the runner-grippers with the runner, said springs acting to swing the links to which they are attached inwardly and thereby counter-act any tendency of outward breaking of the pivot joints between the links of each pair.

In testimony whereof I affix my signature.

GEORGE W. MARTIN.